(12) United States Patent
Martin

(10) Patent No.: US 12,031,997 B2
(45) Date of Patent: Jul. 9, 2024

(54) METHOD FOR IMPROVING PERFORMANCE OF A SODAR SYSTEM

(71) Applicant: ELECTRO MAGNETIC MEASUREMENTS PTY LTD, Ferny Creek (AU)

(72) Inventor: Andrew Louis Martin, Ferny Creek (AU)

(73) Assignee: ELECTRO MAGNETIC MEASUREMENTS PTY LTD, Victoria (AU)

( * ) Notice: Subject to any disclaimer, the term of this patent is extended or adjusted under 35 U.S.C. 154(b) by 187 days.

(21) Appl. No.: 17/416,794

(22) PCT Filed: Dec. 17, 2019

(86) PCT No.: PCT/AU2019/051389
§ 371 (c)(1),
(2) Date: Jun. 21, 2021

(87) PCT Pub. No.: WO2020/124139
PCT Pub. Date: Jun. 25, 2020

(65) Prior Publication Data
US 2022/0065894 A1 Mar. 3, 2022

(30) Foreign Application Priority Data
Dec. 20, 2018 (AU) .............................. 2018904863

(51) Int. Cl.
G01P 21/02 (2006.01)
G01P 5/24 (2006.01)

(52) U.S. Cl.
CPC .......... G01P 21/025 (2013.01); G01P 5/244 (2013.01)

(58) Field of Classification Search
CPC ........ G01P 21/025; G01P 5/244; G01P 5/241; G01S 15/855; G01S 15/582
See application file for complete search history.

(56) References Cited

U.S. PATENT DOCUMENTS 4,351,188 A 9/1982 Fukushima et al.
6,755,080 B2 6/2004 Martin
(Continued)

FOREIGN PATENT DOCUMENTS

WO 2006135955 A1 12/2006
WO 2014053013 A1 4/2014
(Continued)

OTHER PUBLICATIONS

WO-2015166428-A1 (machine translation) (Year: 2015).*

*Primary Examiner* — Yuqing Xiao
*Assistant Examiner* — Christopher Richard Walker
(74) *Attorney, Agent, or Firm* — Dickinson Wright PLLC; Andrew D. Dorisio

(57) ABSTRACT

This invention relates to a method of reducing error in a SODAR system adapted to locate discontinuities in the atmosphere over a range extending away from an acoustic transmitter and receiver, the method comprising the steps of: measuring wind to determine either a substantially upwind direction or a substantially downwind direction relative to the transmitter; transmitting one or more forward or reverse acoustic chirps in the substantially upwind or downwind direction; receiving one or more acoustic echoes of the transmitted chirps; and processing the acoustic echoes to provide an indication of the discontinuities in the atmosphere over the range, thereby providing a wind shear profile.

26 Claims, 9 Drawing Sheets

(56) References Cited

U.S. PATENT DOCUMENTS

| | | |
|---|---|---|
| 7,317,659 B2 | 1/2008 | Martin |
| 2006/0162440 A1* | 7/2006 | Martin .................. G01S 15/885 |
| | | 73/170.13 |
| 2010/0226208 A1 | 9/2010 | Walls |
| 2013/0228010 A1* | 9/2013 | Bertolotti .............. G01S 15/885 |
| | | 73/170.16 |
| 2015/0241561 A1* | 8/2015 | Martin .................. G01S 15/586 |
| | | 367/100 |
| 2017/0045615 A1 | 2/2017 | Martin |
| 2017/0322307 A1* | 11/2017 | Martin .................... G01S 7/521 |
| 2018/0246138 A1* | 8/2018 | Holtom ................ G01S 13/956 |

FOREIGN PATENT DOCUMENTS

| | | | |
|---|---|---|---|
| WO | WO-2014053013 A1 * | 4/2014 | ............. G01S 15/34 |
| WO | WO-2015166428 A1 * | 11/2015 | ............. G01P 13/02 |

* cited by examiner

| Wind Direction | North beam chirp direction | South beam chirp direction | East beam chirp direction | West beam chirp direction |
|---|---|---|---|---|
| North West | positive | negative | negative | positive |
| South West | negative | positive | negative | positive |
| South East | negative | positive | positive | negative |
| North East | positive | negative | positive | negative |

Figure 9

| Wind Direction | North beam chirp direction | South beam chirp direction | East beam chirp direction | West beam chirp direction |
|---|---|---|---|---|
| North West | negative | positive | positive | negative |
| South West | positive | negative | positive | negative |
| South East | positive | negative | negative | positive |
| North East | negative | positive | negative | positive |

Figure 10

METHOD FOR IMPROVING PERFORMANCE OF A SODAR SYSTEM

This application claims priority from Australian Provisional Patent Application No. 2018904863 filed on 20 Dec. 2018, the contents of which are to be taken as incorporated herein by this reference.

TECHNICAL FIELD

The present invention relates to the field of SODAR systems for use in atmospheric sounding and in particular relates to a method and system for correcting Doppler induced wind speed range errors.

BACKGROUND OF INVENTION

SODAR systems use pulse compression of acoustic signals (preferably acoustic chirps) that have relatively wide bandwidth (when compared to conventional short pulse SODAR systems) to obtain vertical wind speed and direction as well as large and small scale turbulence.

Use of relatively wideband acoustic chirps in SODAR systems (to realize the full advantages of pulse compression) provides many potential advantages over conventional short pulse single frequency systems including increased gain and better resolution but also introduces several problems including problems associated with systematic Doppler errors in measurements used to obtain the wind speed and direction, which may be introduced into the wind speed and direction measurements.

A pulse compression by linear frequency modulation (or chirp) based SODAR system is the subject of Applicant's U.S. Pat. No. 6,755,080 entitled Acoustic Sounding. The invention disclosed in that patent involves an acoustic sounding system wherein the component tones in a transmitted chirp are mixed, correlated and differenced or otherwise compared with the component tones in an echo chirp resulting from the reflection, refraction and/or scattering of the transmitted chirp. In this way, chirp transit times (and therefore the location of reflecting or refracting discontinuities in height) can be indicated as a time difference between the transmitted and the received chirps at any given instant. Furthermore, phase variation in an echo tone can be detected and displayed to indicate variation in velocity of the reflecting or refracting discontinuity with respect to the transmitter and/or receiver to ultimately derive a wind shear profile representative of wind speed and direction measurements. The transmitted acoustic chirp can be generated by feeding a loudspeaker with an electrical input signal from a signal generator (for example), while the echo chirp can be detected using a microphone that generates an electrical echo signal.

Systems and methods for acoustically sounding air are also the subject of Applicant's U.S. Pat. No. 7,317,659 entitled Measurement of Air Characteristic in the Lower Atmosphere. The invention disclosed in that patent involves an acoustic sounding system in which echoes from a transmitted chirp are detected during transmission of the chirp. In simpler terms, there is "listening while sending". The invention also includes a system in which multiple receivers are located near a common transmitter so that each will receive echoes from each transmitted chirp. The receivers are located close enough to share a common acoustic and system noise environment and are arranged so as to receive the same direct signal (in both frequency spectrum and amplitude). This allows received signal components (e.g., direct signal, ground clutter and noise) that are common to more than one receiver to be efficiently removed by differencing the signals from two or more receiver locations. "Multi-receiver" includes systems where multiple receivers are used and where a separate chirp is transmitted for each receiver location. However, such systems are prone to Doppler errors in measurements used to obtain the wind speed and direction.

A convenient arrangement of receivers in a system for vertical atmospheric sounding is to locate one receiver at each cardinal compass point (i.e., four receivers, transceivers, or transducers) around similarly located transmitters and to slightly incline opposed receivers toward or away from one another. Thus, the phase components common to the North-South receiver signals are removed by phase differencing to leave that associated with variation of the net North-South wind over range distance. Systems of this type are suitable for vertical sounding in noisy environments such as airports, power stations and urban areas.

Generally, the same methods and systems may be employed by the present invention with the addition of a method and processing by a system to correct the systematic Doppler errors. In this context systematic Doppler errors relate to wind speed height (range) errors where the wind speed measured at a given height is displaced to a greater or lesser height on opposite beams (North and South or East and West for instance), resulting in excessive resolution and wind speed height errors that are double what they otherwise could be if such range displacements could be arranged to be in the same direction.

It would be desirable to provide a method and system which ameliorates or at least alleviates systematic Doppler errors in measurements used to obtain the wind speed and direction in SODAR systems.

A reference herein to a patent document or other matter which is given as prior art is not to be taken as an admission that that document or matter was known or that the information it contains was part of the common general knowledge as at the priority date of any of the claims.

SUMMARY OF INVENTION

According to an aspect of the present invention, there is provided a method of reducing error in a SODAR system adapted to locate discontinuities in the atmosphere over a range extending away from an acoustic transmitter and receiver, the method comprising the steps of: measuring wind to determine either a substantially upwind direction or a substantially downwind direction relative to the transmitter; transmitting one or more forward or reverse acoustic chirps in the substantially upwind or downwind direction; receiving one or more acoustic echoes of the transmitted chirps; and processing the acoustic echoes to provide an indication of the discontinuities in the atmosphere over the range, thereby providing a wind shear profile.

In one or more embodiments, one or more forward acoustic chirps are transmitted in the substantially upwind direction; and one or more reverse acoustic chirps are transmitted in the substantially downwind direction.

In one or more embodiments, one or more reverse acoustic chirps are transmitted in the substantially upwind direction; and one or more forward acoustic chirps are transmitted in the substantially downwind direction.

In one or more embodiments, the wind direction is measured by the SODAR system.

In one or more embodiments, the wind direction is measured by an anemometer.

In one or more embodiments, the method further comprises processing the wind shear profile to correct Doppler induced wind speed range errors associated with the acoustic echoes by: differencing the acoustic echoes received from the reverse acoustic chirps from the acoustic echoes received from the forward acoustic chirps to generate corresponding forward and reverse signal phase data. Advantageously, differencing the acoustic echoes received from the forward and reverse chirps on opposite beams results in range errors that are in the same direction thereby halving the range error that would otherwise be observed. When the range error is in the same direction for opposite beams, it can be removed by shifting the wind speed data at each range to a new height depending on the wind speed derived from the Doppler measurements.

In one or more embodiments, the forward and reverse acoustic chirps are transmitted on first and second beams.

In one or more embodiments, the first and second beams are inclined substantially equally and oppositely to one another and fall in a first plane that extends across the range.

In one or more embodiments, the forward and reverse acoustic chirps are transmitted on multiple beams and on different frequency bands.

In one or more embodiments, the forward and reverse acoustic chirps are transmitted on third and fourth beams.

In one or more embodiments, the third and fourth beams are inclined substantially equally and oppositely to one another and fall in a second plane that extends across the first plane. The first, second, third and fourth beams may be directed to cardinal compass points such that one set of two beams is directed North and South, while another set of two beams may be directed East and West. Additionally, there may be provided a vertical beam.

In one or more embodiments, the forward acoustic chirp comprises a negative linear acoustic signal that has a decreasing phase or frequency.

In one or more embodiments, the reverse acoustic chirp comprises a positive linear acoustic signal that has an increasing phase or frequency.

In one or more embodiments, the acoustic chirps comprise coded pulses having pulse compression waveforms.

In one or more embodiments, the forward and reverse acoustic chirps are transmitted in sequence.

According to another aspect of the present invention, there is provided a system for locating discontinuities in the atmosphere over a range extending away from an acoustic transmitter and receiver, the system comprising: a sensor adapted to determine either a substantially upwind direction or a substantially downwind direction relative to the transmitter; a transmitter adapted to transmit one or more forward or reverse acoustic chirps in the substantially upwind or downwind direction; a receiver adapted to receive one or more acoustic echoes of the transmitted chirps; and a processor adapted to process the acoustic echoes to provide an indication of the discontinuities in the atmosphere over the range, thereby providing a wind shear profile.

In one or more embodiments, one or more forward acoustic chirps are transmitted in the substantially upwind direction; and one or more reverse acoustic chirps are transmitted in the substantially downwind direction.

In one or more embodiments, one or more reverse acoustic chirps are transmitted in the substantially upwind direction; and one or more forward acoustic chirps are transmitted in the substantially downwind direction.

In one or more embodiments, the wind direction is sensed by the SODAR system.

In one or more embodiments, the wind direction is sensed by an anemometer.

In one or more embodiments, the processor is adapted to process the wind shear profile to correct Doppler induced wind speed range errors associated with the acoustic echoes by: differencing the acoustic echoes received from the reverse acoustic chirps from the acoustic echoes received from the forward acoustic chirps to generate corresponding forward and reverse signal phase data. Advantageously, differencing the acoustic echoes received from the forward and reverse chirps on opposite beams results in range errors that are in the same direction thereby halving the range error that would otherwise be observed. When the range error is in the same direction for opposite beams, it can be removed by shifting the wind speed data at each range to a new height depending on the wind speed derived from the Doppler measurements.

In one or more embodiments, the forward and reverse acoustic chirps are transmitted on first and second beams.

In one or more embodiments, the first and second beams are inclined substantially equally and oppositely to one another and fall in a first plane that extends across the range.

In one or more embodiments, the forward and reverse acoustic chirps are transmitted on multiple beams and on different frequency bands.

In one or more embodiments, the forward and reverse acoustic chirps are transmitted on third and fourth beams.

In one or more embodiments, the third and fourth beams are inclined substantially equally and oppositely to one another and fall in a second plane that extends across the first plane. The first, second, third and fourth beams may be directed to cardinal compass points such that one set of two beams is directed North and South, while another set of two beams may be directed East and West. Additionally, there may be provided a vertical beam.

In one or more embodiments, the forward acoustic chirp comprises a negative linear acoustic signal that has a decreasing phase or frequency.

In one or more embodiments, the reverse acoustic chirp comprises a positive linear acoustic signal that has an increasing phase or frequency.

In one or more embodiments, the acoustic chirps comprise coded pulses having pulse compression waveforms.

In one or more embodiments, the transmitter is adapted to transmit the forward and reverse acoustic chirps in sequence.

BRIEF DESCRIPTION OF DRAWINGS

The invention will now be described in further detail by reference to the accompanying drawings. It is to be understood that the particularity of the drawings does not superseded the generality of the preceding description of the invention.

FIG. 9 shows a table of chirp directions for each quadrant of wind direction which produces only positive range errors; and FIG. 10 shows a table of chirp directions for each quadrant of wind direction which produces only negative range errors.

DETAILED DESCRIPTION

Figure 1:
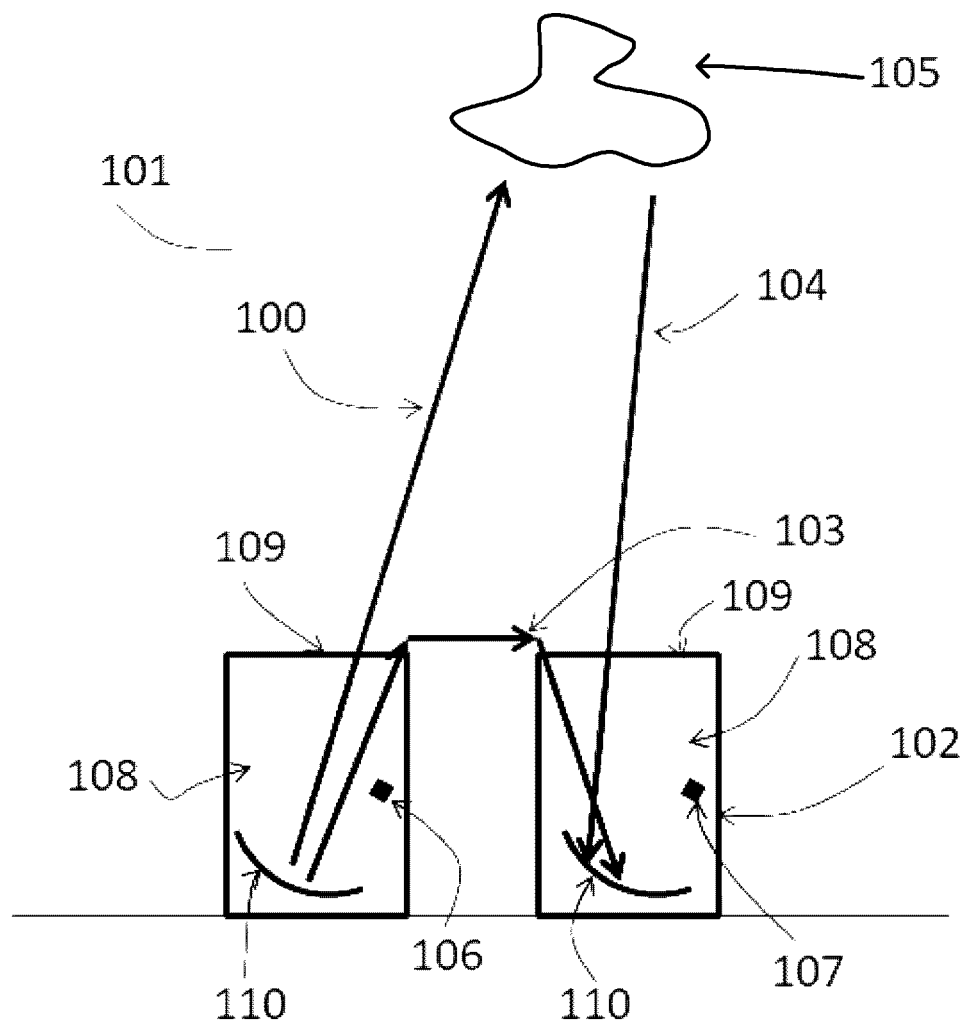
FIG. 1 shows a pulse compression SODAR system that uses acoustic chirp signals suitable for locating discontinuities in the atmosphere.

FIG. 1 shows a pulse compression SODAR system 101 that uses acoustic chirp signals suitable for locating discontinuities in the atmosphere.

Referring to FIG. 1, a chirp signal 100 comprising an audio signal that increases or decreases in frequency over time is generated and amplified before application to a loudspeaker 106 (transmitting acoustic transducer, or transmitter) and reflector system 110 which directs acoustic energy upwards. The acoustic energy is reflected from discontinuities in the atmosphere 105. The reflected signal 104 is received by a microphone (receiving acoustic transducer, or receiver) 107 and parabolic reflector dish 110. The loudspeaker 106 and microphone 107 are each located within its own separate acoustic baffle 108 that is open only at the top 109.

The loudspeaker 106 and acoustic baffle 108 are preferably arranged so that the acoustic output of the loudspeaker 106 is directed upwards. The microphone 107 and its acoustic baffle 108 may also be arranged so as to preferentially receive sounds travelling downwards. The loudspeaker 106 and microphone 107 may be angled slightly away from one another and illuminate a parabolic reflector dish 110. Despite the use of acoustic baffles and the like, a direct signal 103 is received by microphone 107. The direct signal 103 is not subject to any Doppler effect from the wind or disturbances in the atmosphere, whereas the reflected signal 104 is subject to Doppler shift as the wind passes over the loudspeaker 106 and microphone 107. To that end, the direct signal 103 will not be identical with the transmitted chirp signal 100 because of the acoustic shielding provided by the baffles 108 employed around the loudspeaker 106 and microphone 107. The direct signal 103 can be subtracted from the reflected signal 104 using known DSP techniques but, if the overlap of the direct 103 and reflected signals 104 is not great for the reflected signals 104 of most interest, processing in the Fourier or frequency domain can effectively remove or discount most direct signals 103.

In one embodiment, three microphones 107 are spaced around a common parabolic reflector dish 110 and three loudspeakers 106 are spaced around another common reflector dish 110 to provide three separate beams. The loudspeakers 106 generate three beams in a substantially vertical direction and the echoes are received by each of the three microphones 107. Each loudspeaker beam is arranged to substantially coincide with its corresponding microphone beam. The beams can be directed to cardinal compass points such that one set of three beams is directed North (N), South (S) and Vertical (V), while another set of two beams can be directed towards East (E) and West (W).

As will be discussed with reference to FIGS. 2 and 3, in another embodiment, the receiving dish may have more or less than three microphones located therein. For example, there may be provided a configuration in which each of the three microphones designated N, S, V has its own receiving dish N, S, V (respectively) with the three loudspeakers 107 also having a separate dish. A similar arrangement may be used for the E and W beams. However, it will be appreciated that in such configurations, acoustic chirps (forward or reverse) may be transmitted on multiple beams and on different frequency bands from more than one loudspeaker. For example, first and second beams inclined substantially equally and oppositely to one another and falling in a first plane that extends across the range. Additionally, third and fourth beams inclined substantially equally and oppositely to one another and falling in a second plane that extends across the first plane may also be employed.

Configurations employing three transmitters 106 and three microphones 107 may be adapted for vertical or inclined atmospheric sounding where both cross-range (horizontal, in this case) and along-range (vertical, in this case) wind velocities are required. For convenience, however, it will be assumed that chirps from the transmitter are directed substantially vertically upwards in beams which illuminate an inverted cone of air. Also for convenience, the cardinal points will be referred to as N, S, V and E, W, as well as North, South, Vertical, East and West where thought necessary. It will also be convenient to describe the microphone positions in relation to those exemplary, but non-limiting, geographical positions.

However, it will be appreciated that the invention is not limited to the use of five receivers (microphones) and five transmitters (loudspeakers), or to vertical sounding systems or to the symmetrical placement of receivers around a transmitter.

Figure 2:
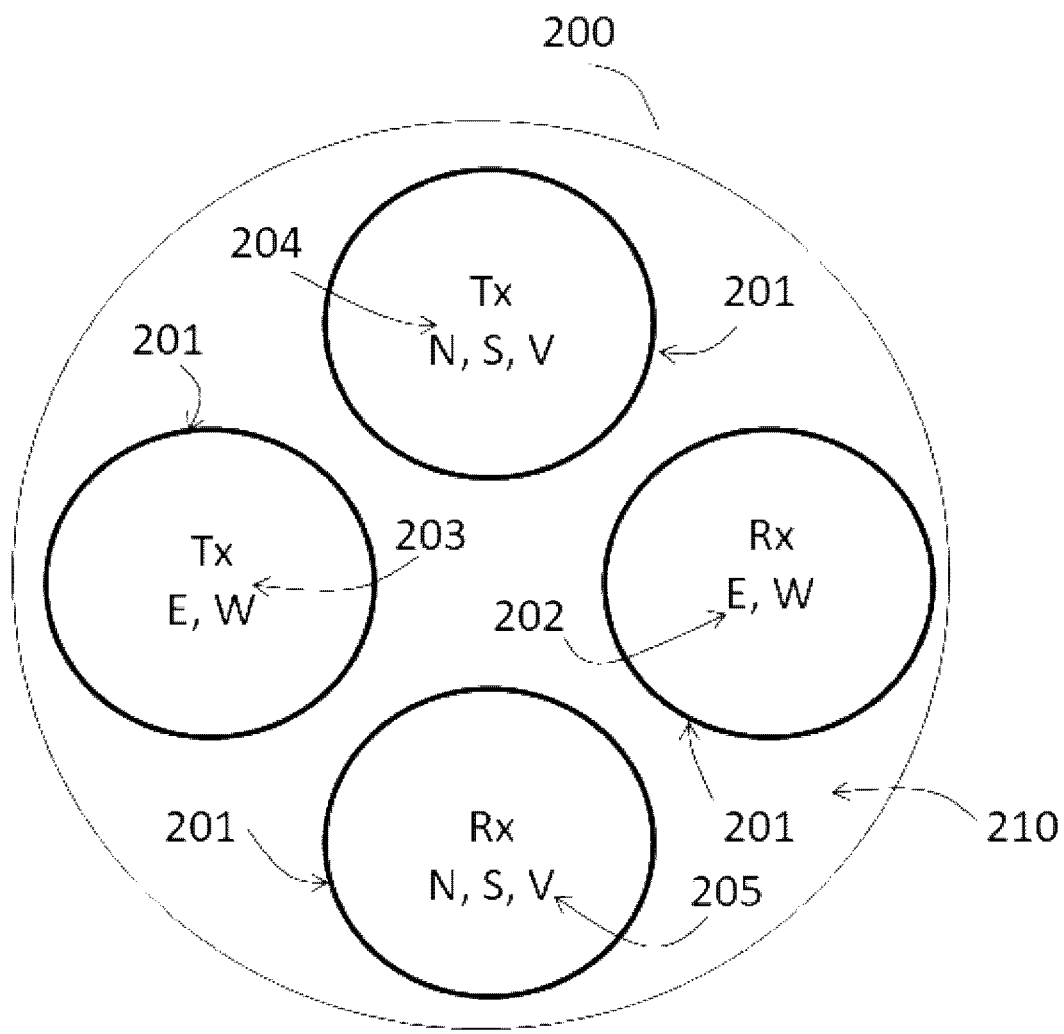
FIG. 2 shows a schematic plan of the arrangement of microphones and loudspeakers according to an embodiment of the invention.

Referring to FIG. 2, system 200 includes within an area 210 four sets of acoustic baffles and dish reflectors 201 arranged in quadrature and generally aligned with cardinal points. W and E microphones (Rx) 202 are shown on the East or right side of E, W loudspeaker (Tx) 203. The N, S, V microphones (Rx) are shown on the South or lower side of N, S, V loudspeakers (Tx) 204. The axis of each microphone N, S, E, W are angled to the vertical at between about 3 and 10 degrees. The loudspeakers 203, 204 and microphones 202, 205 are located near the focus of the baffle and dish reflector structures 201.

As will be appreciated, from the configuration shown in FIG. 2, Doppler (phase) components common to echoes detected by all microphones at much the same time are indicative of the velocities of atmospheric discontinuities in the vicinity of an axis projecting substantially vertically from loudspeakers 203 and 204, and it can be expected that these common components will be most prominent in the echoes detected by microphones 202 and 205. If the Doppler components of echoes received by W and E microphones 202 are subtracted, the common Doppler (phase) components indicative of the vertical velocity component will be removed and it can be assumed that the remaining Doppler (phase) components are due to net wind speed in the horizontal East or West direction. Similar subtraction of the Doppler components of echoes received by the N and S microphones 205 will yield the net wind speed in the horizontal North or South direction. From this, a wind shear profile can be derived from the received signals by known methods. For example, the processing may include segmenting received phase information into several height ranges and then using the average wind information within that range to calculate the frequency shifts due to Doppler within the range. The processing may also include a method of adding together or interpolating between each range segment over the height of the wind information to obtain a complete wind profile including a wind direction in near real-time.

The use of chirp signals results in Doppler errors in the derived wind speed profile. These errors can be propagated to greater heights as the wind speed profile is generally obtained by upwards addition of the Doppler shift in each height segment e.g., adding together the outputs from a plurality of height segments to generate an incremental or cumulative phase from the ground up. Range errors (height errors) and resolution errors arise in conventional chirp SODAR from the use of the above-described echoes used to determine the wind speed. These wind speed range and resolution errors arise from Doppler induced errors that shift the wind speed estimates to a greater or lower height than their actual height depending on whether the chirp SODAR beams are pointed into (upwind) or out of the wind (downwind). For example, looking into the wind the Doppler shift is positive and looking in the opposite direction the Doppler shift is negative, thus effectively having a doubling effect on any errors.

It will be appreciated that in practice, there will be many atmospheric discontinuities at many altitudes within range that generate echoes and that the time of return of such echoes will be indicative of range or altitude and the amplitude of the echoes will be indicative of the magnitude of the respective discontinuities.

Figure 3:
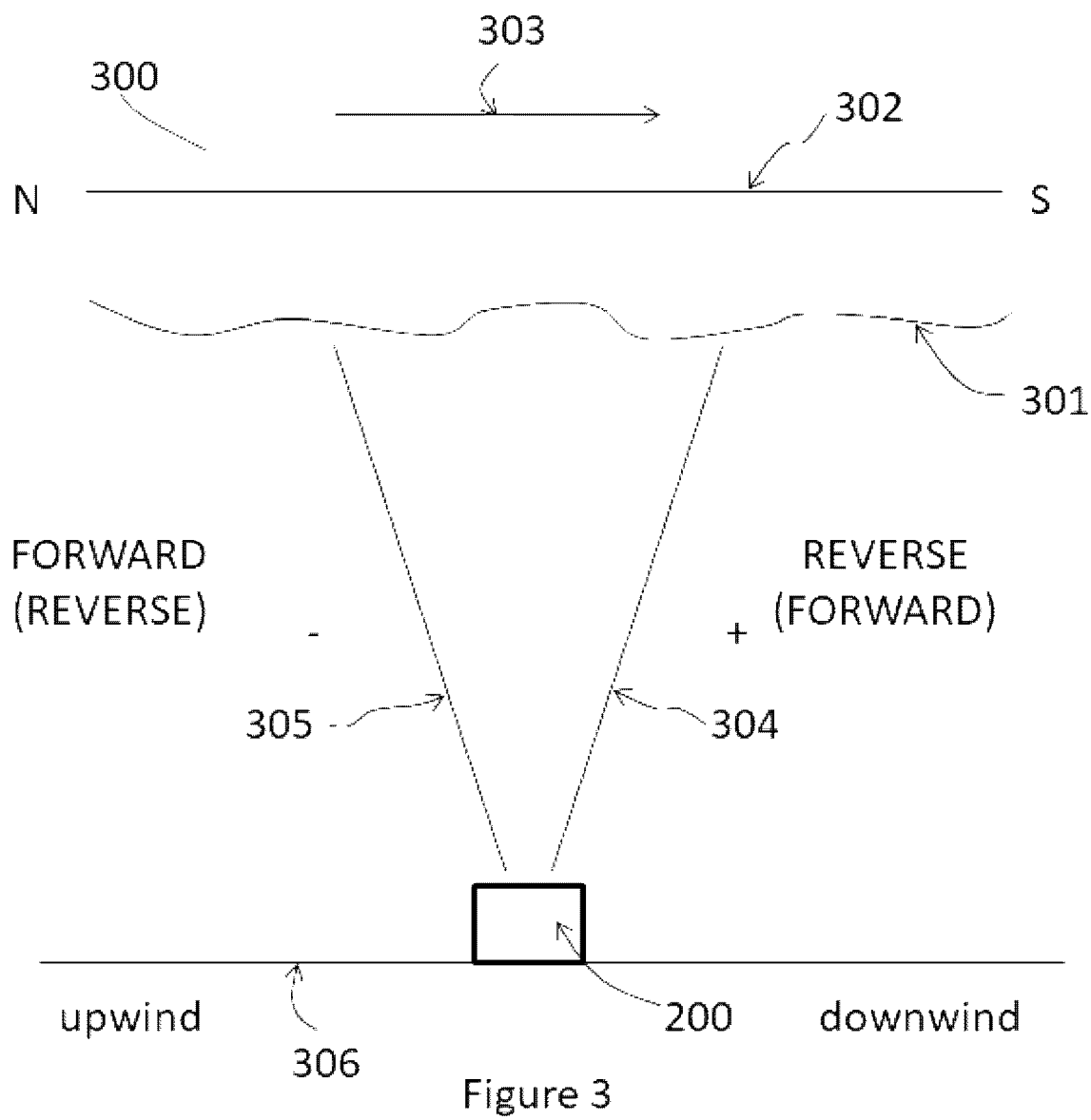
FIG. 3 shows a simplified diagrammatic sectional elevation showing an arrangement of a transmitter and receivers according to an embodiment of the invention.

Referring to FIG. 3, an atmospheric discontinuity 301 is shown parallel to a North-South direction 302 (the atmospheric discontinuity may be turbulence associated with small scale temperature changes or the like). The wind direction 303 has also been determined as travelling in a North-South direction. In one or more embodiments, the wind direction is determined by the SODAR system 200 to determine a substantially upwind direction or a substantially downwind direction relative to the loudspeaker in near real-time. In one or more embodiments, the wind direction is measured by an anemometer at 10 m (not shown). Such a measurement can be made by using a guyed tower or the like. A cup anemometer and wind vane, or a vane with a propeller speed sensor mounted in front may also be employed. The primary quantity required is the average wind direction. A representative value may be obtained from values taken every few seconds.

After the wind direction has been determined, the SODAR system 200 transmits one or more forward acoustic chirps in the substantially upwind direction 305 and one or more reverse acoustic chirps in the substantially downwind direction 304. With this arrangement the range error will be negative in that the received signals will show an atmospheric structure that is closer to the ground than it actually is. It will be appreciated that the forward acoustic chirp 305 includes a positive linear acoustic signal that has an increasing phase or frequency and the reverse acoustic chirp 304 includes a negative linear acoustic signal that has a decreasing phase or frequency. In one or more embodiments, the acoustic chirps may also include coded pulses having pulse compression waveforms or the like. The generation of chirps for transmission and the processing of received echoes may be implemented by known methods, whether in software or hardware. The mode of implementation will be influenced by the desired chirp length, listening time or intended range and the like, and those skilled in the art will recognise suitable signal generation and receiver designs for providing the stated functions.

It will be appreciated that the SODAR system 200 may alternatively transmit one or more reverse acoustic chirps in the substantially upwind direction and one or more forward acoustic chirps in the substantially downwind direction. With this arrangement the range error will be positive in that the received signals will show an atmospheric structure that is further away from the ground that it actually is. This arrangement of transmitted chirps may be adjusted for each quadrant of wind direction so that wind from all directions can be corrected for using the system described with reference to FIG. 2, for example.

By transmitting two differently coded chirps sequentially using two transmitters and two receivers, the cumulative phase outputs can be processed to remove the systematic Doppler error components. Preferably, the two chirps are identical positive and negative linear phase chirps (e.g., the positive one rising from 2780 Hz to 2880 Hz and the negative one descending from 2880 Hz to 2780 Hz at the same phase rate). Tables showing arrangements of positive and negative chirps for various wind directions are shown in FIGS. 9 and 10.

The remaining elements shown in FIG. 3 are identical to FIG. 2 and so share the same references.

Figure 4:
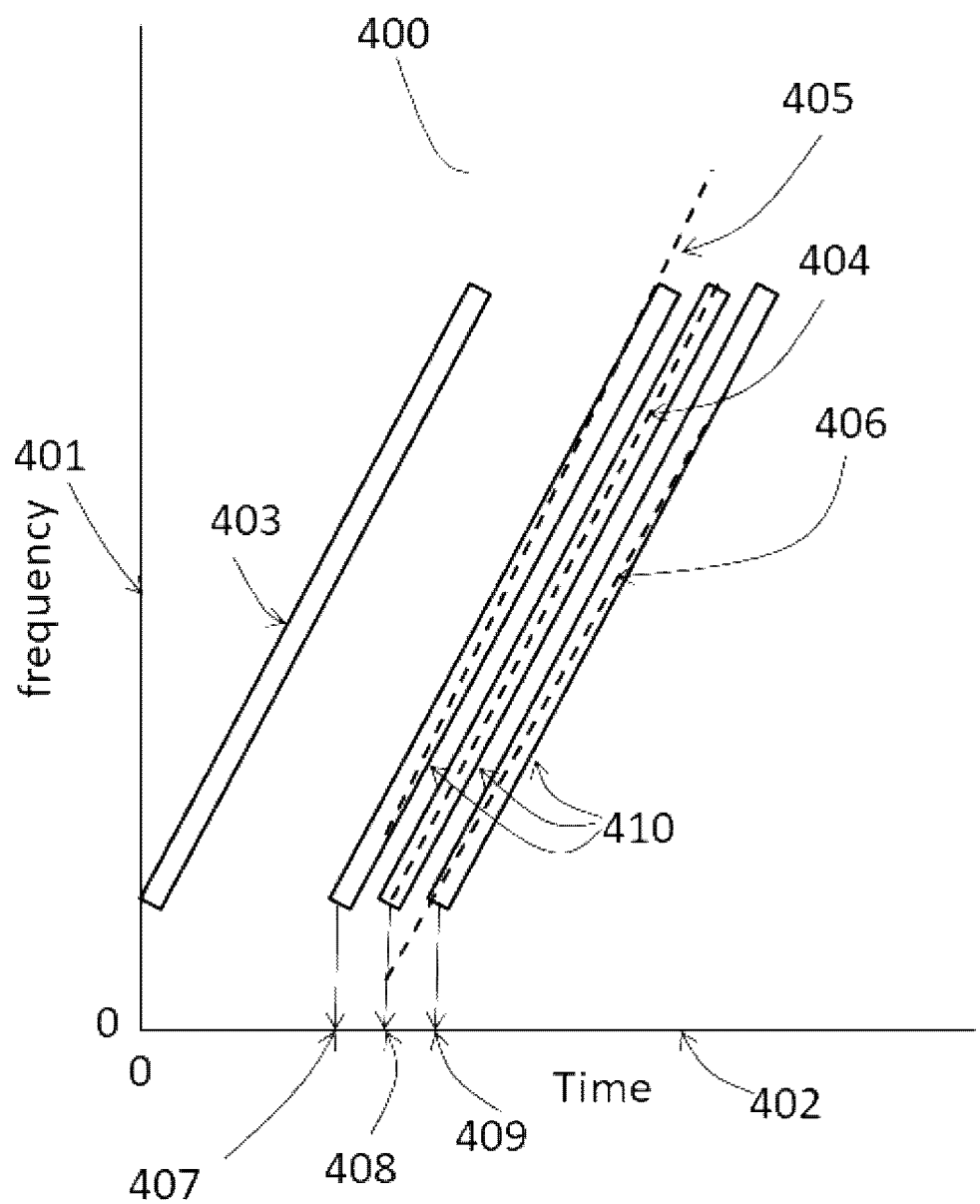
FIG. 4 shows a diagrammatic representation of positive range errors and negative Doppler shifts for a positive chirp direction.

Referring to FIG. 4, a diagram 400 is shown depicting how the wind direction (upwind or downwind) affects the Doppler shift and hence range error for a positive transmitted chirp 403. The positive transmitted chirp 403 increases in frequency 401 with time 402. Reflected signal 404 is a signal reflected from an atmospheric discontinuity that is not subject to horizontal wind and hence displays no Doppler shift.

When the transmitted signal 410 is correlated with the reflected signal 404 having no Doppler shift, a correct range (time) 408 for the atmospheric discontinuity is observed (correlation may be performed by a matched filter receiver or the like).

When the transmitted signal 410 is transmitted upwind there will be a positive Doppler frequency shift of the reflected signal 405. When the transmitted signal 410 is correlated with the reflected signal 405 having a positive Doppler frequency shift, a negative range (time) error 407 for the atmospheric discontinuity is observed.

When the transmitted signal 410 is transmitted downwind there will be a negative Doppler frequency shift of the reflected signal 406. When the transmitted signal 410 is correlated with the reflected signal 406 having a negative Doppler frequency shift, a positive range (time) error 409 for the atmospheric discontinuity is observed.

Figure 5:
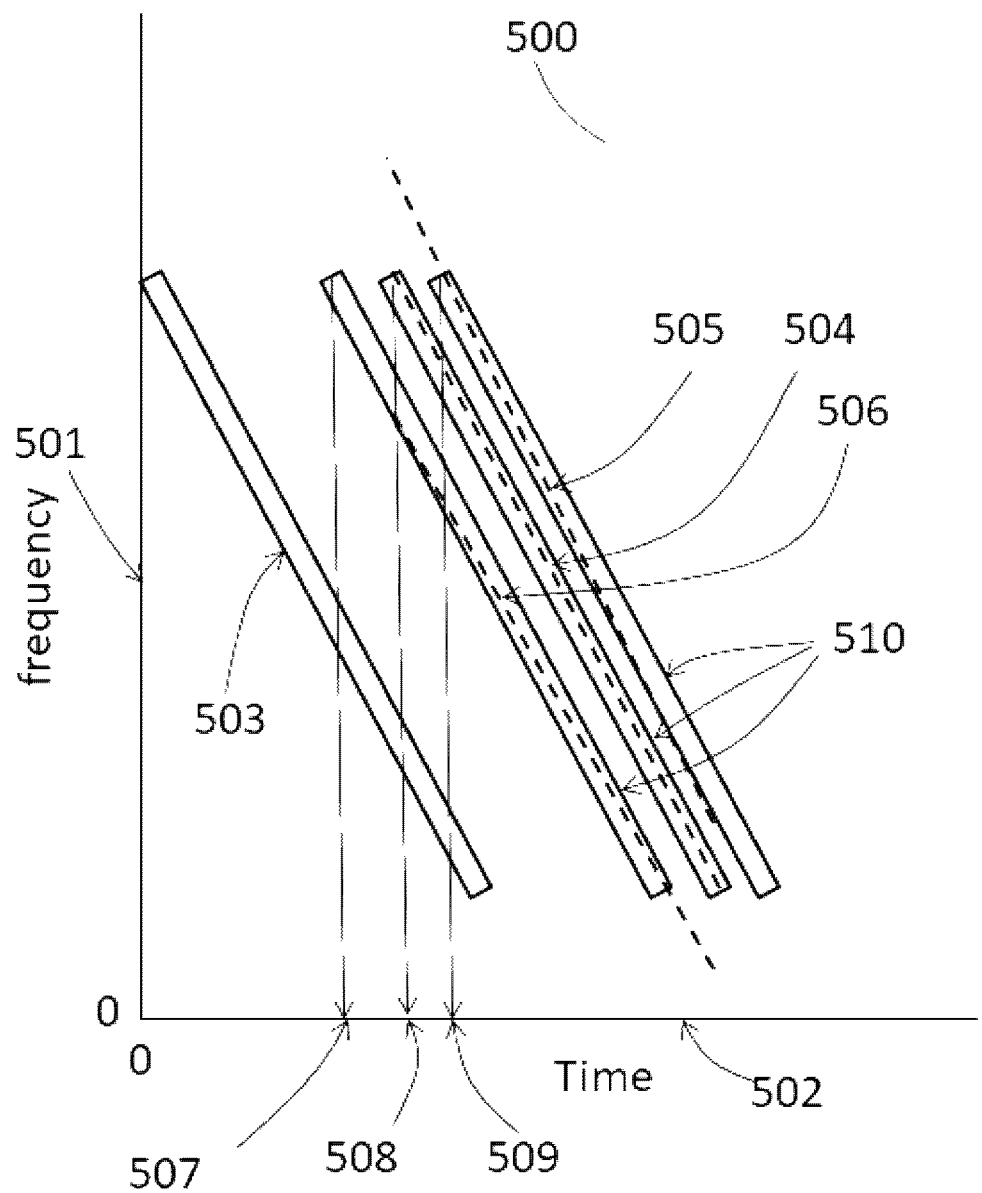
FIG. 5 shows a diagrammatic representation of negative range errors and positive Doppler shifts for a negative chirp direction.

Referring to FIG. 5, a diagram 500 is shown depicting how the wind direction (upwind or downwind) affects the Doppler shift and hence range error for a negative transmitted chirp 503. The negative transmitted chirp 503 decreases in frequency 501 with time 502. Reflected signal 504 is a signal reflected from an atmospheric discontinuity that is not subject to horizontal wind and hence displays no Doppler shift.

When the transmitted signal 510 is correlated with the reflected signal 504 having no Doppler shift, a correct range (time) 508 for the atmospheric discontinuity is observed.

When the transmitted signal 510 is transmitted upwind there will be a positive Doppler frequency shift of the reflected signal 505. When the transmitted signal 510 is correlated with the reflected signal 505 having a positive Doppler frequency shift, a positive range (time) error 509 for the atmospheric discontinuity is observed.

When the transmitted signal 510 is transmitted downwind there will be a negative Doppler frequency shift of the reflected signal 506. When the transmitted signal 510 is correlated with the signal from the atmosphere 506 having a negative Doppler frequency shift, a negative range (time) error 507 for the atmospheric discontinuity observed.

Figure 6:
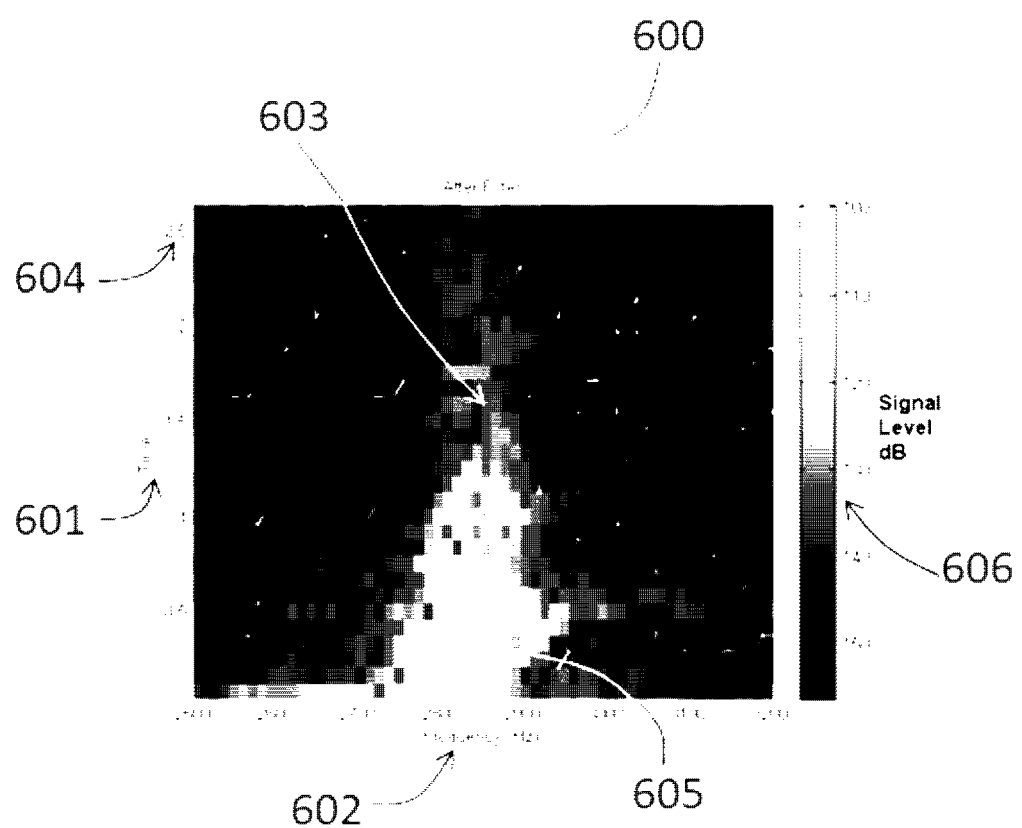
FIG. 6 shows a spectrogram of positive chirp signals backscattered from the atmosphere.

Referring to FIG. 6, a spectrogram 600 is shown for time period 601 against frequency 602. The received signals 603 have been backscattered from the atmosphere to a time of 2.5 seconds 604 for a positive chirp. The positive chirp between 2800 Hz to 2900 Hz is most evident for the signals received from the atmosphere immediately above the loudspeaker 605. The received signal intensity is shown by the shade of graph 606 as a representation of decibels (dB).

Figure 7:
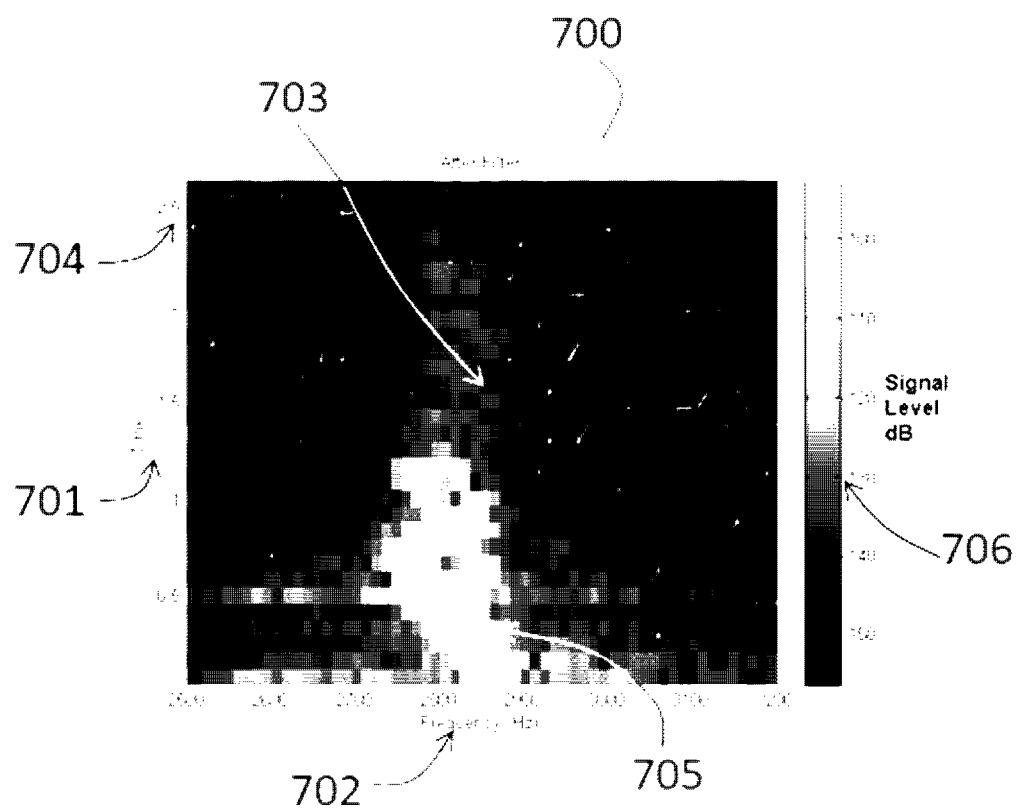
FIG. 7 shows a spectrogram of negative chirp signals backscattered from the atmosphere.

Referring to FIG. 7, a spectrogram 700 is shown for time period 701 against frequency 702. The received signals 703 have been backscattered from the atmosphere to a time of 2.5 seconds 704 for a negative chirp. The negative chirp between 2900 Hz to 2800 Hz is most evident for the signals received from the atmosphere immediately above the loudspeaker 705. The received signal intensity is shown by the shade of graph 607 as a representation of decibels (dB).

Differencing the acoustic echoes received from the forward and reverse chirps on opposite beams results in range errors that are in the same direction halving the range error that would otherwise be observed. When the range error is in the same direction for opposite beams, it can be removed by shifting the wind speed data at each range to a new height depending on the wind speed derived from the Doppler measurements.

The range error is given by:

$$\text{range error} = 2vfT/B$$

where v is the along beam wind speed as measured by the chirp SODAR, f is the chirp centre frequency, T is the time for which the chirp is transmitted and B is the bandwidth of the chirp. Thus for a horizontal wind speed of 10 m/s and with the North, South, East and West beams offset from the vertical by 7 degrees the along beam wind speed is given by:

$$\text{along beam wind speed} = \sin(7) \times 10 \text{ m/s} = 1.22 \text{ m/s}$$

For example, the resultant range error for a centre frequency of 2850 Hz, a time for which the chirp is transmitted of 0.2 seconds and a chirp bandwidth of 100 Hz gives a range error of 13.9 meters, thereby shifting the position at which a wind speed of 1.22 m/s is measured to a new height by a factor of 13.9 meters.

It will be appreciated that the above calculations may be simplified by keeping the chirp parameters of frequency, time and bandwidth constant so that the along beam wind speed location can be shifted to a new location by an amount proportional to the measured along beam wind speed, in this case by 13.9/1.22=11.4. Accordingly, multiplying the along beam wind speed at any range by 11.4 will provide the amount by which the range of that wind speed must be shifted to completely correct for the Doppler induced range error.

In one or more embodiments, the above described range error correction is provided for the opposite cardinal points after the North-South beams are subtracted and the East-West beams are subtracted. In this way, systematic errors are removed by opposite beam subtraction before the range error is ultimately corrected.

Figure 8:
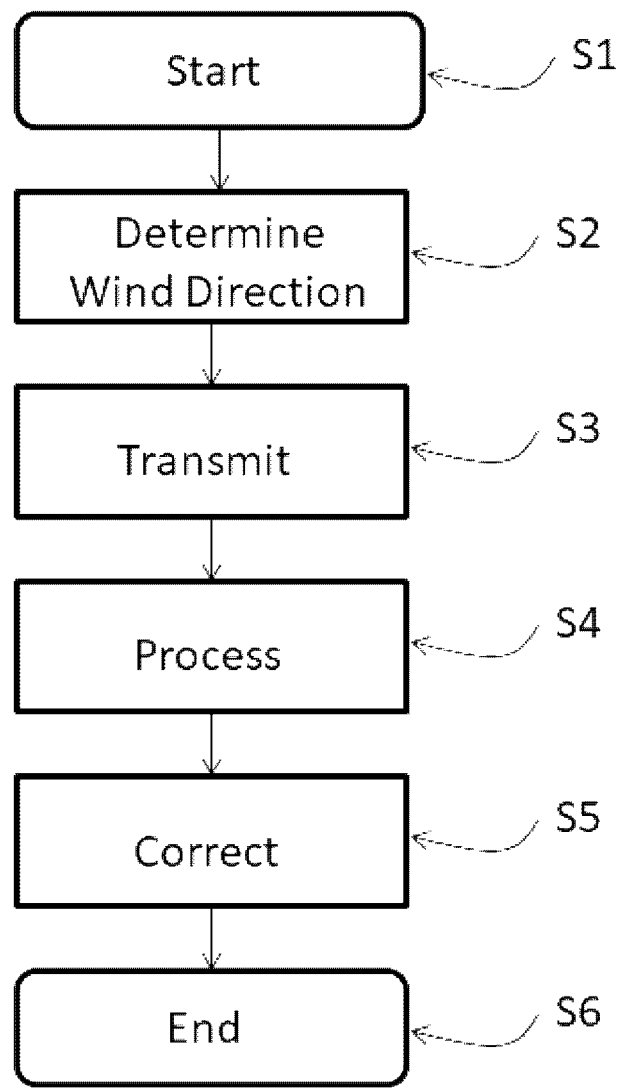
FIG. 8 shows a flowchart of a control process of an exemplary embodiment of the invention.

Referring to FIG. 8, there is shown a flowchart illustrating a method of reducing error in a SODAR system adapted to locate discontinuities in the atmosphere over a range extending away from an acoustic transmitter and receiver. The method begins at start block S1 and proceeds to block S2 where a direction is determined as either a substantially upwind direction or a substantially downwind direction relative to the transmitter. At block S3 one or more forward or reverse acoustic chirps are transmitted in the substantially upwind or downwind direction, the selection of forward and reverse chirps depends on the wind direction. For example, one or more forward acoustic chirps in the substantially upwind direction and one or more reverse acoustic chirps in the substantially downwind direction (or one or more reverse acoustic chirps in the substantially upwind direction and one or more forward acoustic chirps in the substantially downwind direction). At block S4 the echoes of the transmitted chirps are processed to provide an indication of discontinuities in the atmosphere by correcting for systematic Doppler errors associated with the acoustic echoes by differencing the signal phase data of the acoustic echoes received from the opposite beams of forward and reverse acoustic chirps. This provides the wind speed in the North-South direction and the East-West direction. At block S5 the range error is removed from the North-South wind speed profile and the East-West wind speed profile. From this, the wind speed and direction is derived, thereby providing a wind shear profile. The wind shear profile generally provides an indication of wind speed and wind direction at a plurality of range segments. The method terminates at block S6.

Referring to FIG. 9, a table of wind directions is shown against a beam direction. With reference to FIG. 2, a convenient arrangement of receivers in a system for vertical atmospheric sounding is to locate one receiver at each cardinal compass point. For example, if the wind direction is determined to be North-West (e.g., substantially in the direction of the North-West quadrant of FIG. 2), the North beam chirp direction is positive to produce a negative range error (as discussed with reference to FIG. 4), and so forth.

Referring to FIG. 10, a table of wind directions is shown against a beam direction. With reference to FIG. 2, a convenient arrangement of receivers in a system for vertical atmospheric sounding is to locate one receiver at each cardinal compass point. For example, if the wind direction is determined to be North-West (e.g., substantially in the direction of the North-West quadrant of FIG. 2), the North beam chirp direction is negative to produce a positive range error (as discussed with reference to FIG. 5), and so forth.

Advantageously, the use of positive and negative linear chirps is of particular value in the reduction of unwanted Doppler error components in techniques for measuring wind speed disclosed herein. Linear chirps are also easily generated and their echoes convenient to process using available DSP and Fourier techniques implemented using personal computers.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

While the invention has been described in conjunction with a limited number of embodiments, it will be appreciated by those skilled in the art that many alternative, modifications and variations in light of the foregoing description are possible. Accordingly, the present invention is intended to embrace all such alternative, modifications and variations as may fall within the spirit and scope of the invention as disclosed.

The claims defining the invention are as follows:

1. A method of reducing range error in a SODAR system adapted to locate discontinuities in the atmosphere over a range extending away from an acoustic transmitter and receiver, the method comprising the steps of:
    measuring wind to determine either a substantially upwind direction or a substantially downwind direction relative to the transmitter;
    transmitting one or more forward acoustic chirps in the substantially upwind direction and one or more reverse acoustic chirps in the substantially downwind direction using a table of chirp directions for each quadrant of wind direction which produces only positive range errors;
    receiving one or more acoustic echoes of the transmitted chirps; and
    processing the acoustic echoes to provide an indication of the discontinuities in the atmosphere over the range, thereby providing a wind shear profile.

2. The method according to claim 1, wherein the wind direction is measured by the SODAR system.

3. The method according to claim 1, wherein the wind direction is measured by an anemometer.

4. A method according to claim 1, further comprising the steps of:
    processing the wind shear profile to correct Doppler induced wind speed range errors associated with the acoustic echoes by:
    differencing the acoustic echoes received from the reverse acoustic chirps from the acoustic echoes received from the forward acoustic chirps to generate corresponding forward and reverse signal phase data.

5. The method according to claim 1, wherein the forward and reverse acoustic chirps are transmitted on first and second beams.

6. The method according to claim 5, wherein the first and second beams are inclined substantially equally and oppositely to one another and fall in a first plane that extends across the range.

7. The method according to claim 1, wherein the forward and reverse acoustic chirps are transmitted on multiple beams and on different frequency bands.

8. The method according to claim 7, wherein the forward and reverse acoustic chirps are transmitted on third and fourth beams.

9. The method according to claim 8, wherein the third and fourth beams are inclined substantially equally and oppositely to one another and fall in a second plane that extends across the first plane.

10. The method according to claim 1, wherein the forward acoustic chirp comprises a negative linear acoustic signal that has a decreasing phase or frequency.

11. The method according to claim 1, wherein the reverse acoustic chirp comprises a positive linear acoustic signal that has an increasing phase or frequency.

12. The method according to claim 1, wherein the acoustic chirps comprise coded pulses having pulse compression waveforms.

13. The method according to claim 1, wherein the forward and reverse acoustic chirps are transmitted in sequence.

14. A system for locating discontinuities in the atmosphere over a range extending away from an acoustic transmitter and receiver, the system comprising:
    a sensor adapted to determine either a substantially upwind direction or a substantially downwind direction relative to the transmitter;
    a transmitter adapted to transmit one or more forward acoustic chirps in the substantially upwind direction and one or more reverse acoustic chirps in the substantially downwind direction using a table of chirp directions for each quadrant of wind direction which produces only positive range errors;
    a receiver adapted to receive one or more acoustic echoes of the transmitted chirps; and
    a processor adapted to process the acoustic echoes to provide an indication of the discontinuities in the atmosphere over the range, thereby providing a wind shear profile.

15. The system according to claim 14, wherein the wind direction is sensed by the SODAR system.

16. The system according to claim 14, wherein the wind direction is sensed by an anemometer.

17. The system according to claim 14, wherein:
    the processor is adapted to process the wind shear profile to correct Doppler induced wind speed range errors associated with the acoustic echoes by:
    differencing the acoustic echoes received from the reverse acoustic chirps from the acoustic echoes received from the forward acoustic chirps to generate corresponding forward and reverse signal phase data.

18. The system according to claim 14, wherein the forward and reverse acoustic chirps are transmitted on first and second beams.

19. The system according to claim 18, wherein the first and second beams are inclined substantially equally and oppositely to one another and fall in a first plane that extends across the range.

20. The system according to claim 14, wherein the forward and reverse acoustic chirps are transmitted on multiple beams and on different frequency bands.

21. The system according to claim 20, wherein the forward and reverse acoustic chirps are transmitted on third and fourth beams.

22. The system according to claim 21, wherein the third and fourth beams are inclined substantially equally and oppositely to one another and fall in a second plane that extends across the first plane.

23. The system according to claim 14, wherein the forward acoustic chirp comprises a negative linear acoustic signal that has a decreasing phase or frequency.

24. The system according to claim 14, wherein the reverse acoustic chirp comprises a positive linear acoustic signal that has an increasing phase or frequency.

25. The system according to claim 14, wherein the acoustic chirps comprise coded pulses having pulse compression waveforms.

26. The system according to claim 14, wherein the transmitter is adapted to transmit the forward and reverse acoustic chirps in sequence.

* * * * *